United States Patent
Singh et al.

[15] 3,676,695
[45] July 11, 1972

[54] NONLINEAR OPTICAL DEVICES UTILIZING SUBSTANTIALLY HEXAGONAL SILICON CARBIDE DEVICES

[72] Inventors: Shobha Singh, Summit; Le Grand Gerard Van Uitert, Morris Twsp., Morris County, both of N.J.

[73] Assignee: Bell Telephone Laboratories, Incorporated, Murray Hill, N.J.

[22] Filed: July 23, 1971

[21] Appl. No.: 165,075

[52] U.S. Cl................307/88.3, 321/69 R, 331/107 R
[51] Int. Cl...............................................H03f 7/04
[58] Field of Search............307/88.3; 321/69; 330/4.5; 331/107 R

*Primary Examiner*—Roy Lake
*Assistant Examiner*—Darwin R. Hostetter
*Attorney*—R. J. Guenther et al.

[57] ABSTRACT

Optical devices depending for their function upon the incorporation of substantially hexagonal silicon carbide are useful for electromagnetic radiation frequency conversion at near infrared wavelengths. Such devices may be operated inter alia as second harmonic generators or as parametric downshifters.

5 Claims, 2 Drawing Figures

INVENTORS  S. SINGH
L.G. VAN UITERT

BY George S. Indig
ATTORNEY

NONLINEAR OPTICAL DEVICES UTILIZING SUBSTANTIALLY HEXAGONAL SILICON CARBIDE DEVICES

BACKGROUND OF THE INVENTION

1. Field of the Invention

The invention is concerned with frequency conversion of electromagnetic radiation through the use of nonlinear materials, such conversion, generally of coherent radiation, may take the form of second harmonic generation and of other parametric arrangements, e.g., frequency downshifting, frequency mixing, etc.

2. Description of the Prior Art

The past decade has seen a large research and development effort directed to coherent light sources and ancillary circuit elements. One such class of elements depends upon nonlinear properties of certain materials in accordance with which the degree of polarization of the material produced by transmission of radiation is amplitude dependent. This manifestation makes possible the conversion of at least a portion of incident radiation from one wavelength to another. Various of these devices may operate to increase frequency (e.g., harmonic generators such as second harmonic generators, etc.) or to decrease frequency (e.g., by degenerate or nondegenerate parametric oscillation).

Concern with nonlinear elements has increased with the realization that the number of wavelengths of coherent radiation available from efficient CW (continuous wave) laser structures is likely to remain limited. This is particularly true of solid-state structures where only two or three single frequencies (in or near the infrared) have become available.

For effective frequency conversion utilizing a nonlinear element, account must be taken of the dispersive nature of real media, i.e., the variation in velocity with frequency. It was earlier recognized that this characteristic of all real materials imposed a limitation on the traversal distance within a medium within which the phase relationship between successive portions of an introduced wavelength is sufficiently close to permit continuing constructive interaction. This problem was overcome through birefringent phase matching. Accordingly, materials were so chosen and introduction of radiation (usually plane polarized) was such that ordinary and extraordinary rays corresponding with different wavelengths traveled with the same velocity. (See, J. A. Giordmaine, Vol. 8, Physical Review Letters, page 19 (1962)). A plethora of materials having usable nonlinear coefficients and appropriate values of birefringence have emerged. They include KDP (potassium dihydrogen phosphate), lithium niobate ($LiNbO_3$) and "-bananas" ($Ba_2NaNb_5O_{15}$). Development of such materials has involved attention to growth, to damage produced on exposure to light, and to a host of other problems. Available materials include compositions which are useful for most phase matching conditions at most wavelengths from about one micrometer through the visible spectrum.

Construction of effective nonlinear devices operated at wavelengths longer than about one micrometer is somewhat problematical. Most of the better nonlinear materials become quite absorbing in this range or else birefringent and dispersion characteristics are such as to prevent effective operation.

SUMMARY OF THE INVENTION

A crystalline variety of silicon carbide, SiC, is appropriately included as the functional composition in nonlinear optical devices. This material is highly transparent over the wavelength range extending from the upper portion of the visible spectrum to near infrared wavelengths of about four micrometers. Dispersion and birefringence permit phase matching for a variety of conditions including two waves, one twice the length of the other at about room temperature within the infrared range (SHG or degenerate parametric oscillation). Increasing temperature permits phase matching of more closely related wavelengths in the infrared.

The silicon carbide phase has generally been considered to be hexagonal. In actuality, some such material is distorted from true hexagonal by nonrepetitive stacking orders along the c-axis. Such variations are usefully incorporated in the devices of the invention.

DETAILED DESCRIPTION

1. Composition

Figure 1:
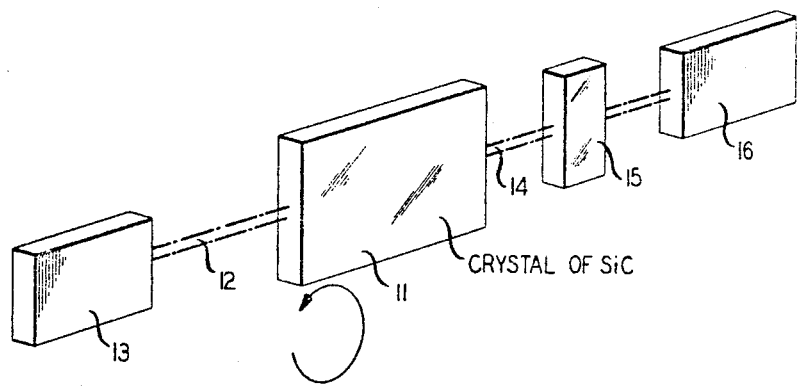
FIG. 1 is a schematic view of a nonlinear device, using a material of the invention.

It has been indicated that the devices of the invention depend upon the incorporation of silicon carbide of a crystalline form designated "hexagonal". It has been indicated that suitable material may deviate from true hexagonal by virtue of distortion, in turn, introduced by nonrepetitive stacking. Historically, since this form of silicon carbide was the first reported, it has sometimes been designated $\alpha$ silicon carbide. The true hexagonal form, as well as suitable variations, belongs to the acentric point group 6mm. Lattice constants are $a = 3.076$ A and $c = 5.048$ A. Polymorphic variations deviating from hexagonal are approximately designated in the same manner. (See, "The Microscopic Characters of Artificial Inorganic Solid Substances", Academic Press, New York (1964), pp. 6,7).

In general, materials utilized in accordance with the inventive teachings are unmodified by intentional inclusions and conform closely to the indicated stoichiometry. From the standpoint of unintentional inclusions, it is desirable to adhere to usual practice for optical compositions. High purity starting ingredients are available and, from the standpoint of unintentional inclusions, it is to be expected that the final composition will have a purity of at least 99.9 percent. Under certain circumstances, it may be desirable to modify the composition so as to compensate, for example, for unintentional impurities, for site vacancies, or for other crystalline imperfections. Inclusions made for this purpose do not generally exceed one percent by weight based on the entire composition. Accordingly, suitable compositions for the inventive purpose may be described as being at least 99.9 percent by weight, SiC.

2. Growth

Hexagonal silicon carbide may be grown in accordance with techniques set forth in the literature. See, for example, Vol. 32, Ber. Deut. Keram., p. 299 (1955). In accordance with this technique, starting ingredients, silicon and carbon, are prereacted to form polycrystalline mass of silicon carbide. The so-formed material is held in a cylindrical space between a graphite heater and a thin, wall graphite tube. The material is heated to a temperature within a range of 2,300° to 2,700° C at which temperature the mass sublimes, diffuses through the thin wall of the tube into the center of the cylinder and there crystallizes. The growth is carried out under a protective atmosphere of argon or hydrogen to suppress evaporation of graphite. Further details on this particular growth technique may be obtained from "Silicon Carbide,", Pergamon Press, New York 1960, or from Volume 5 of the Journal of Crystal Growth, page 59 (1969).

Following the above procedure, p-type colorless single crystals of approximate dimensions up to 1cm by 1cm were obtained. Specimens were cut and polished into flat and parallel X-cut slabs of dimensions 5 mm by 5 mm by 3 mm. A prism was fabricated from one of the slabs by optionally polishing two nonparallel edges. Measurements and described characteristics were based on specimens so prepared.

The following table sets forth the relationship between wavelength in micrometers, $\lambda(\mu m)$ and refractive index for the ordinary ray, $n_o$ and for the extraordinary ray, $n_e$.

TABLE I

Measured Refractive Indices of Hexagonal SiC at Room Temperature

| λ(μm) | $n_o$ | $n_e$ |
|---|---|---|
| 0.4880 | 2.6916 | 2.7423 |
| 0.5017 | 2.6837 | 2.7337 |
| 0.5145 | 2.6771 | 2.7261 |
| 0.5321 | 2.6689 | 2.7167 |
| 0.6328 | 2.6351 | 2.6794 |
| 1.064 | 2.5830 | 2.6225 |

3. Optical Properties

Figure 2:
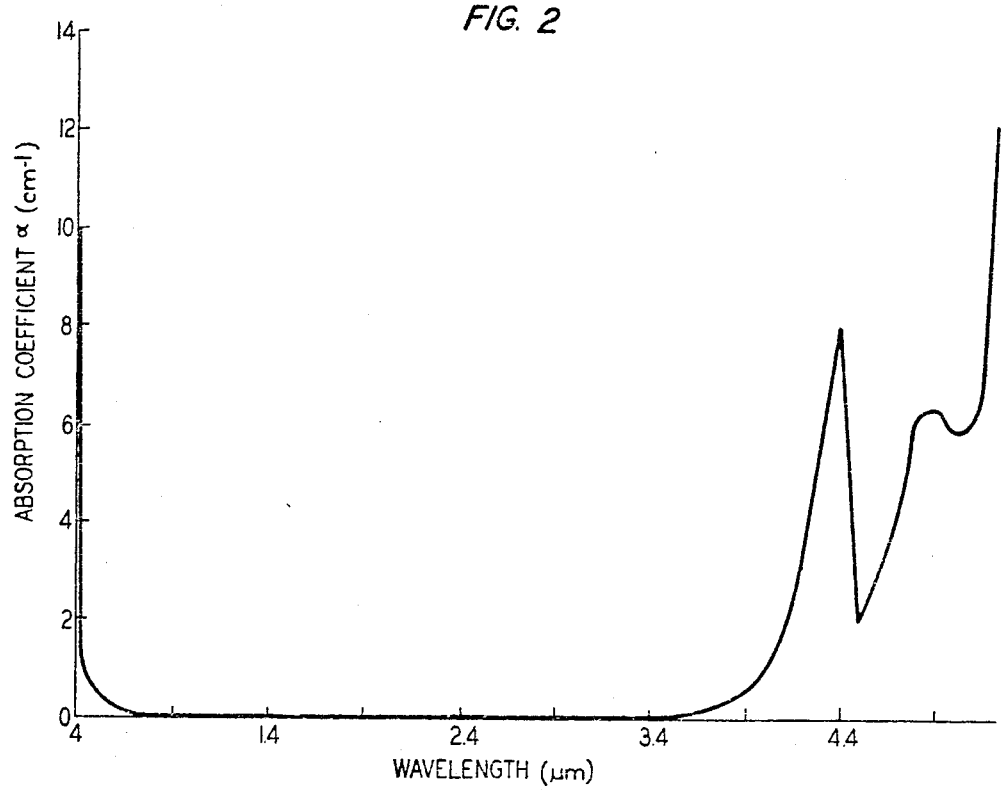
FIG. 2, on coordinates of absorption coefficient, $\alpha$, and wavelength, is a plot showing the relationship of these two parameters in hexagonal silicon carbide.

The absorption spectrum for hexagonal silicon carbide is set forth in FIG. 2. Useful transparency extends from about 0.4 micrometers to about 4.0 micrometers. Crystals are found to be positive uniaxial with the extra-ordinary index larger than the ordinary index for any given frequency. Table I sets forth such indices as measured at room temperature. The data listed in the table were fitted to a single effective oscillator dispersion equation of the form:

$$n^2 - 1 = E_d E_o / (E_o^2 - E^2),$$

where:

$n$ = refractive index relative to vacuum,
$E$ = photon energy,
$E_o$ = single oscillator energy,
$E_d$ = dispersion energy.

Note: See Volume 23, Physical Review, p. 1,156 (1969).

Values of the listed parameters in the equation were found to be as follows:

$E_o(n_o) = 7.63$ e.v.
$E_o(n_e) = 7.34$ e.v.
$E_d(n_o) = 42.3$ e.v.
$E_d(n_e) = 42.1$ e.v.

The second harmonic generating coefficients of SiC were determined by the technique described in Vol. 8, Physical Review Let., p. 21 (1962). The pump source used was a Q-switched $Nd^{3+}$-YAlG laser. The second harmonic coefficients ($d_{ij}$) are set forth below in units of meters per volt (m/v):

$d_{31} = -10.6 \times 10^{-12}$
$d_{33} = +20 \times 10^{-12}$
$d_{15} = -10.2 \times 10^{-12}$.

4. The Figures

In FIG. 1, there is depicted a single crystal body 11 of a material of the invention. A coherent electromagnetic beam 12 produced by source 13 is introduced into body 11, as shown. The resultant emerging beam 14 is then caused to pass through filter 15, and, upon departing, is detected by apparatus 16. For the SHG case, beam 12 is of a fundamental frequency while departing beam 14 additionally contains a wave of a frequency corresponding with the first harmonic of beam 12. Filter 15 is of such nature as to pass only the wave of concern (in the SHG instance that of the harmonic). Apparatus 16 senses only that portion of the beam leaving filter 15.

The device of the figure may similarly be regarded as a three-frequency device, with beam 12 containing frequencies to be mixed or consisting of a pump frequency. Under these conditions, exiting beam 14 contains signal and idler frequencies as well as pump, representing three distinct values for nondegenerate operation. For any operation, whether two frequency or three, efficiency is increased by resonance. Such may be accomplished by coating the surfaces of crystal 11, through which the beam enters and exits. The existing coating may be completely reflecting for the pump frequency but only partially reflecting for a generated frequency as, for example, for the the harmonic in SHG. For the three-frequency case, it is desirable to support both generated frequencies. In most instances, this cannot be accomplished by coating the face of the crystal, and it is necessary to provide at least one spaced adjustable mirror which may be positioned at such distance from the face of the crystal 11 as to support the frequencies of concern. Simultaneous support of the pump frequency may similarly be accomplished. However, the complication so introduced is justified only when the pump level requires it.

FIG. 2 has been discussed above. It is a plot showing the relationship of absorption in units of reciprocal centimeters to wavelength in units of micrometers. It is on the basis of the plotted data that the transparency range has been described as extending from about 0.4 to 4.0 micrometers.

5. Example

This example describes a downshifting parametric oscillator operating in a degenerate mode and utilizing a pump wavelength of 1.06 micrometers. The element consists of a cut section of SiC of dimensions 5 mm by 3 mm by 3 mm with the larger dimension corresponding with a Y-crystallographic axial direction and with such larger dimension defining the propagation direction. The input and exit surfaces of the crystal are optically polished and are coated with a layered refractive index mirror. The imput and output mirrors are essentially transparent for the 1.06 micrometer pump energy. The input mirror is essentially totally reflecting for 2.12 micrometer wave energy and the output mirror is partially transmitting for this energy (about 1 percent transmitting). The pump energy is plane-polarized and propagated parallel to a Y-axial direction. The plane of polarization of the pump wave is generally 45° off of the z or x-axis, thus dividing the energy into two parts — one propagated polarized along the extraordinary or z-axis and the other along the ordinary or x-axis. The emerging downshifted signal is polarized parallel to the x-axis. Noncritical phase matching results at a temperature of about 100° C.

Within the transparency range permitted by the mirrored surfaces, operation of the device described in the example may be degenerate or nondegenerate with the longest wavelength of a value limited by the absorption edge value of about 4.0 micrometers. Such operation may be accomplished simply by varying the temperature so as to provide the appropriate phase matching conditions for the desired operating frequencies. Operation as a SHG may be accomplished by introducing the longer wave energy into the crystal while polarized at about 45° to both the x and z-axes. Phase matching may be noncritical again when temperature and/or applied field are such as to provide the appropriate values of birefringence and dispersion.

What is claimed is:

1. Parametric device comprising a crystalline body consisting essentially of a single crystal, said crystal being transparent to electromagnetic wave energy together with first means for introducing a beam of coherent electromagnetic radiation containing a first wavelength component into said body and second means for extracting a beam of coherent electromagnetic radiation containing a second wavelength component different from the first frequency component from said body, characterized in that said body consists essentially of a composition which is essentially a hexagonal form of silicon carbide in which the birefringence of the said body is at least as great as the dispersion in velocity of the two said frequencies within the said body and in which the said body is positioned so that the direction defined by the said incoming beam and the optic axis is such that an ordinary wave of one of the said wavelength components within the said body is phase matched to an extraordinary wave of another of the said wavelength components within the body.

2. Device of claim 1 in which at least one of the said wavelength components has a wavelength of greater than one micrometer.

3. Device of claim 1 in which at least one of said means comprises an optically polished surface.

4. Device of claim 1 together with resonant means for supporting a standing wave of at least one of the said frequencies in the said body.

5. Device of claim 5 in which there are coherent electromagnetic waves of three frequencies within the said body and the frequency relationship is such that the greatest is equal to the sum of the other two.

* * * * *

UNITED STATES PATENT OFFICE
CERTIFICATE OF CORRECTION

Patent No. 3,676,695   Dated July 11, 1972

Inventor(s) S. Singh, L. G. Van Uitert

It is certified that error appears in the above-identified patent and that said Letters Patent are hereby corrected as shown below:

Col. 2, line 70, change "optionally" to --optically--.

Signed and sealed this 6th day of March 1973.

(SEAL)
Attest:

EDWARD M. FLETCHER, JR.  ROBERT GOTTSCHALK
Attesting Officer    Commissioner of Patents